United States Patent
Bottiglieri

[11] Patent Number: 5,959,970
[45] Date of Patent: Sep. 28, 1999

[54] CIRCUIT PACK SPARING ARRANGEMENT

[75] Inventor: Michael Philip Bottiglieri, Wyckoff, N.J.

[73] Assignee: Lucent Technologies Inc., Murray Hill, N.J.

[21] Appl. No.: 08/655,100

[22] Filed: May 29, 1996

[51] Int. Cl.[6] .................................. H04J 1/16; H04J 3/14
[52] U.S. Cl. .......................................... 370/217; 370/217
[58] Field of Search ..................... 370/216, 217, 370/218, 221, 225, 226, 227, 228; 395/180, 181, 182.01, 182.022

[56] References Cited

U.S. PATENT DOCUMENTS

| | | | |
|---|---|---|---|
| 4,819,225 | 4/1989 | Hochstein | 370/216 |
| 4,821,256 | 4/1989 | Schmidt et al. | 370/216 |
| 4,947,385 | 8/1990 | Rau | 370/216 |
| 5,612,946 | 3/1997 | Kanekawa et al. | 370/216 |

*Primary Examiner*—Ajit Patel
*Attorney, Agent, or Firm*—Lester H. Birnbaum

[57] ABSTRACT

The invention is a circuit which permits spare circuit packs to replace operational circuit packs while keeping peripheral circuitry apprised of the status of the packs. The circuit receives signals from a first conductor and returns the signals to the conductor so that a spare circuit pack can be removed without affecting the signals to the peripheral circuits. The circuit also detects the signals on a second conductor and applies the same signals when a circuit pack including the circuit is reconnected. The circuit also includes elements which prevent loading down the conductors while power from the circuit is cut off or during power up.

14 Claims, 2 Drawing Sheets

CIRCUIT PACK SPARING ARRANGEMENT

FIELD OF THE INVENTION

This invention relates to circuitry for providing spare, or alternate, circuit packs in electrical systems.

BACKGROUND OF THE INVENTION

In many systems, it is desirable to provide circuit packs which can become operationable in the event of a failure in the operable circuit packs. For example, in subscriber loop carrier transmission systems, it is common to include two different circuit packs comprising different Time Slot Interchangers (TSIs), one handling communications signals and one acting as a spare or alternate. It is important that the peripheral devices in such systems know which of the two TSIs is active. In order to keep the peripherals apprised of their status, the circuit packs including the TSIs send out signals through an exclusive OR gate so that if both packs send the same signal, a first one of the packs is active, and if the packs send out different signals, a second one of the packs is active.

While such sparing arrangements are generally effective, a problem arises when one of the circuit packs must be physically removed from the system, physically inserted, or there is a failure of the board mounted power supply on the circuit pack. In most cases, the signal normally originating from the removed, inserted or failed circuit pack slot to the peripherals would be changed, thus causing confusion among the peripherals as to which pack was active. It would be more desirable to hold the signal of a circuit pack slot at the level which existed just prior to the circuit pack removal, insertion, or power failure.

SUMMARY OF THE INVENTION

The invention is a circuit comprising means for receiving a first logic signal from a first conductor which is connectable to an alternate, identical circuit, and means for returning the same logic signal to the conductor so that the signal remains on the conductor when the alternate circuit is disconnected from the conductor. The circuit further includes means for detecting a second signal from a second conductor which is also connectable to the alternate circuit and means for applying the same second signal to the second conductor when the circuit is reconnected to the second conductor after having been disconnected from the second conductor.

BRIEF DESCRIPTION OF THE FIGURES

These and other features of the invention are delineated in detail in the following description. In the drawing.

DETAILED DESCRIPTION

Figure 1:
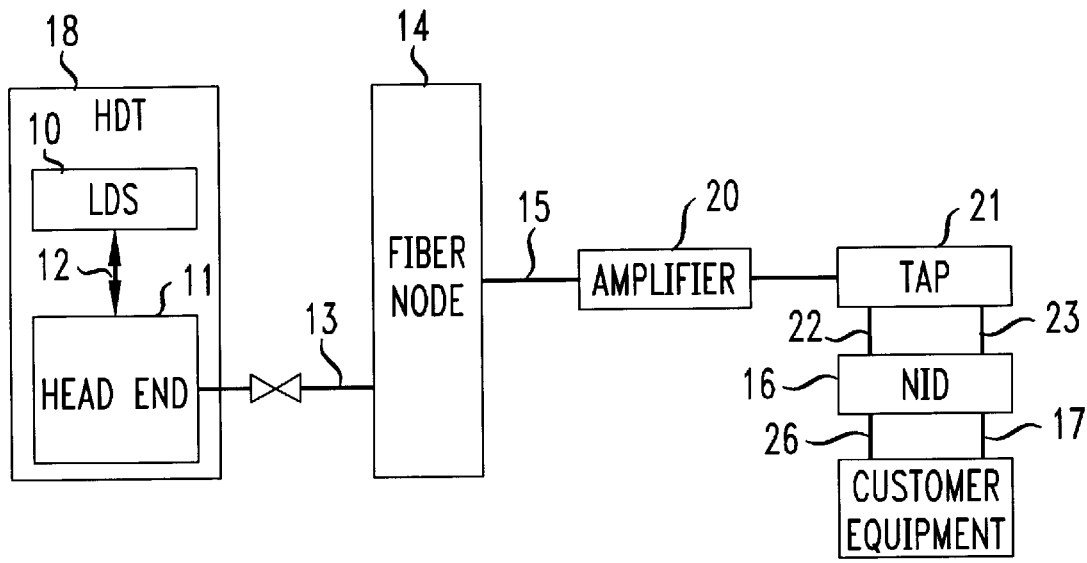
FIG. 1 is a block diagram of a system which may employ the invention.

Referring now to the drawings, in which like reference numerals identify similar or identical elements, FIG. 1 illustrates a system which may employ the invention.

A Host Digital Terminal (HDT), 18, includes a Local Digital Switch (LDS), 10, which provides traditional telecommunications services. The LDS is coupled by means of a bi-directional link, 12, to a Head End, 11, which provides broadband services such as Cable TV and interactive video so that the combined telecommunications and broadband signals can be sent out over a bi-directional optical fiber link, 13. If desired, the signals from the LDS and Head End could be sent over separate fiber links. The optical fiber link, 13, is coupled to a Fiber Node, 14, which is located in the vicinity of a plurality of subscribers and typically serves 200–500 subscribers. The fiber node converts the optical signals to electrical signals and transmits the electrical signals over a coaxial cable, 15.

The coaxial cable, 15, is coupled to amplifiers, e.g., 20, which can be used throughout the system to maintain communications signal levels and can also be used to split the coaxial signal into several branches. Taps, 21, separate power from the communication signal, transmitting the communication signals through a coaxial cable, 22, and power through a copper pair, 23, to Network Interface Devices (NIDs), e.g. 16, mounted outside the subscriber's house. A coaxial cable, 17, connects the NID, 16, to the customer's video equipment, such as a TV or computer, and one or more pair of copper wires, 26, connect to the customer's telephone or computer modem.

In the reverse direction, electrical signals would be transmitted from the customer's equipment, through the NID, 16, and the amplifiers, 20, and to the fiber node, 14, where the electrical signals would be converted to optical signals and sent back to the LDS, 10, and Head End, 11.

Figure 2:
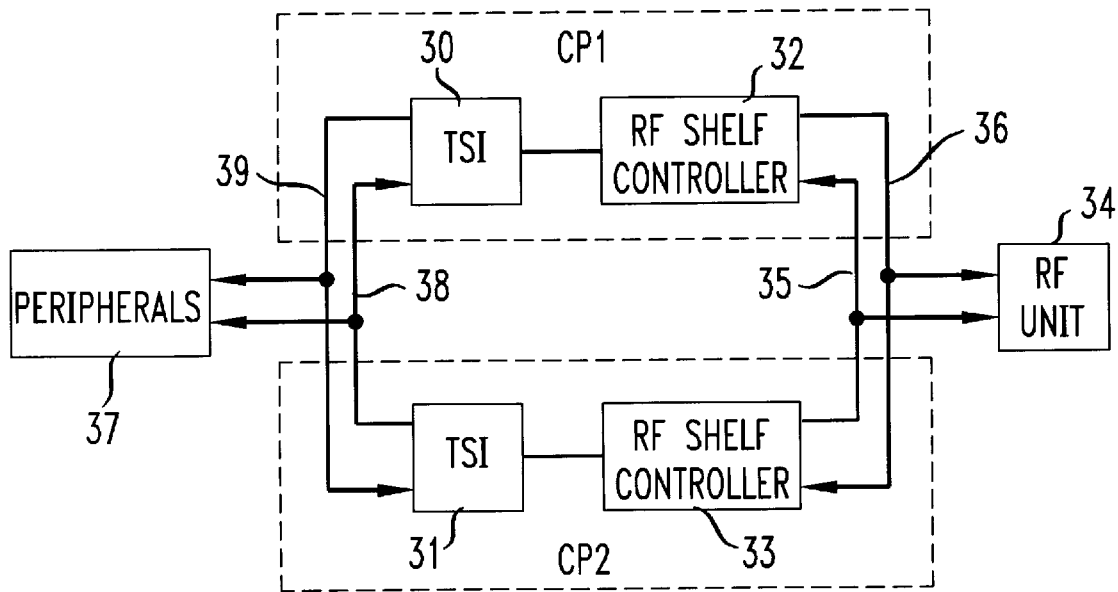
FIG. 2 is a more detailed block diagram of a portion of the system of FIG. 1.

As illustrated in FIG. 2, the HDT, 18, includes two circuit packs, CP1 and CP2 mounted within a shelf (not shown). Each circuit pack includes a Time Slot Interchanger (TSI), 30 and 31, which is electrically connected to an RF Shelf Controller, 32 and 33, respectively. Each shelf controller is electrically coupled to an RF Unit, 34, and to each other on conductors 35 and 36. The RF unit, 34, provides an interface to the NIDs downstream, e.g., 16 of FIG. 1. Each TSI, 30 and 31, is also coupled to a number of peripheral circuits, illustrated by block 37, and to each other on conductors 38 and 39. Typical peripheral circuits include line interface units. Either circuit pack, e.g., CP1, will be operational at any given time. In the event of a failure of that circuit pack, the other circuit pack, e.g., CP2, would take over. Since the peripherals are coupled to both TSIs, it is important that there is some mechanism for the peripherals to determine which TSI is active at any given time.

Figure 3:
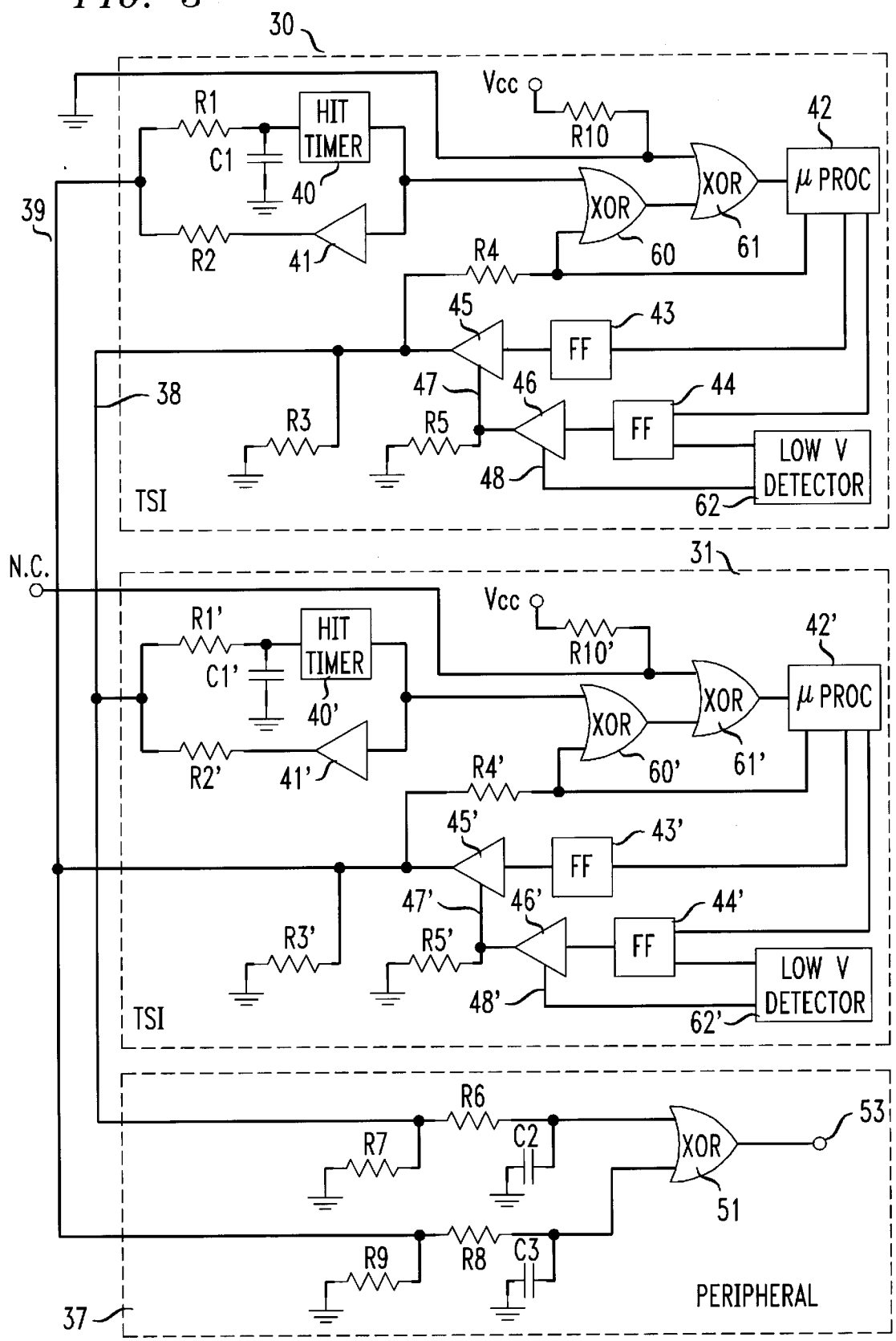
FIG. 3 is a schematic circuit diagram of a circuit in accordance with one embodiment of the invention.

FIG. 3 is a schematic circuit diagram of a portion of the two TSIs, 30 and 31, and a portion of a peripheral circuit, 37, which illustrates certain features of the invention. One TSI, 30, is coupled to conductor 39, through resistors, R1 and R2, which are coupled in series. Resistor R1 is coupled to one plate of a capacitor, C1, which has its other plate grounded. The resistor, R1, is also coupled to the input of a Hit Timer circuit, 40, whose output is coupled to a CMOS buffer, 41. The output of the buffer, 41, is connected to one end of the resistor R2. The output of the hit timer circuit, 40, is also coupled to one input of an exclusive OR gate, 60, whose output is coupled to another exclusive OR gate, 61. The other input of the exclusive OR gate, 61, is coupled to one end of a resistor, R10, whose opposite end is coupled to a board mounted power supply, $V_{cc}$. The same XOR input is coupled to a backplane pin which is grounded. The output of gate 61 is coupled to a microprocessor, 42.

Coupled to conductor 38 is one end of a resistor, R3, whose opposite end is grounded. Also coupled to conductor 38 is one end of a resistor, R4, whose opposite end is coupled to one input of the exclusive OR gate, 60, and to the microprocessor, 42. The microprocessor, 42, is also coupled to the input of a flip flop, 43, and the input of a flip flop 44. The output of flip flop 43 is coupled to a buffer, 45, whose output is coupled to the conductor 38. The output of flip flop 44 is coupled to the input of a buffer, 46, whose output is coupled to the tristate control lead, 47, of the buffer 45. The output of buffer 46 is also coupled to one end of a resistor, R5, which has its opposite end coupled to ground. A low voltage detector, 62, is coupled to the flip flop, 44, and to the tristate control lead, 48, of the buffer 46.

The other TSI, 31, has essentially the same circuitry coupled to conductor 38 as the first TSI, 30, has coupled to conductor 39, except that the input of exclusive OR gate, 61', which is coupled to the resistor, R10', is coupled to a backplane pin which is floating (indicated by N.C.). Further, TSI 31 also has essentially the same circuitry coupled to conductor 39 as TSI 30 has coupled to conductor 38. Consequently, the circuitry of TSI 31 is not discussed in detail here. Elements of TSI 31 corresponding to the elements of TSI 30 use the same designation followed by a prime (').

Conductor 38 is also coupled to each peripheral circuit, 37, through a resistor, e.g., R6. One end of another resistor, R7, is also coupled to the conductor 38 and to one end of the resistor R6. The opposite end of resistor R7 is grounded. The opposite end of the resistor, R6, is coupled to the input of an exclusive OR gate, 51. Also coupled to the resistor R6 and to the input of the OR gate, 51,, is one plate of a capacitor, C2, which has its other plate grounded. Similarly, the conductor 39 is coupled to one end of a resistor, R8, and to one end of a resistor, R9. The opposite end of the resistor R9 is grounded, and the opposite end of the resistor R8 is coupled to an input of the exclusive OR gate, 51. One plate of a capacitor, C3, is also coupled to the resistor R8 and to the input of the OR gate, 51, while the other plate is grounded.

In order to apprise the peripherals as to which of TSIs 30 or 31, is operational, each TSI, 30 and 31, emits a "1" or "0" on one of the conductors 38 and 39, respectively. These signals are fed to the exclusive OR gate, 51. The output at terminal 53, therefore, will be a "0" if the signals on conductors 38 and 39 are the same and a "1" if the signals are different. A "0" output tells the peripheral, 37, to listen to one of the TSIs, e.g., 30, and a "1" tells the peripheral to listen to the other TSI, 31. If desired, a hit timer circuit (not shown) could be inserted after the XOR gate, 51, so that the peripheral would not respond until the condition existed for at least a couple of sample intervals. One of the primary advantages of such a signaling scheme is that either TSI can override the other TSI in the event the latter gets stuck by changing the signal sent out by the former on its corresponding conductor. The TSIs, 30 and 31,, will also be aware of which one is supposed to be operational by means of their own exclusive OR gates, 60 and 60', which exclusive OR the signals from conductors 38 and 39. The signal from the OR gate, 60 and 60' is then sent to the other OR gate, 61 and 61' where, in the case of TSI 30, it will be exclusive ORed with a "0", and in the case of TSI 31, it will be ORed with a "1" so that the TSI can identify itself as the operational or spare TSI.

In the event that it becomes necessary to remove one of the TSIs from the shelf, it is desirable that the signal which was emitted by that TSI on the conductor, 38 or 39, remain as it was prior to removal so that the peripherals would not be confused. This can be accomplished with the circuitry illustrated in FIG. 3. Assume, for example, it is desired to remove TSI 31 for repair. Whatever signal had been sent to the peripheral on conductor 39 from the TSI 31 will also be sent to TSI 30 on conductor 39 and coupled through resistor R1 to Hit Timer circuit, 40. The hit timer circuit, 40, will transmit an output signal which is the same as its input signal after the input signal appears a certain number of times, usually two times, so that the circuit does not respond to blips on the conductor. The output signal is coupled to the buffer, 41, which, in turn, sends the signal through high impedance resistor R2 back onto the conductor, 39. This results in the same signal being sent out on conductor 39 by TSI 30 as was sent out on conductor 39 by TSI 31. In the event that the signal from TSI 31 changes, the new signal will override the signal coming from TSI 30 since the high impedance of resistor of R2 relative to the low output impedance of buffer 45' will permit the new signal to enter the hit timer circuit, 40, and then to the input of the buffer, 41. Since TSI 30 will always reproduce the signal from TSI 31 on conductor 39, the removal of TSI 31 from the shelf will not affect the signal seen by the peripheral circuits, 37, on conductor 39. Similarly, the signal put out by TSI 30 on conductor 38 will always be reproduced by TSI 31 so that TSI 30 can be removed without affecting the signal seen by the peripheral 37 on conductor 38.

Assume further that TSI 31 had been removed and is now inserted back into the shelf. When this happens, the circuit of FIG. 3 also ensures that TSI 31 will not affect the signal on conductor 39 which had been maintained by TSI 30. This is accomplished by keeping buffer 45' of TSI 31 tristated, i.e., in a condition as if it were not connected, during the power up of TSI 31. Specifically, when TSI 31 is initially inserted, flip flops, 43' and 44' will be powered up maintaining a "0" at their outputs. The low voltage detector, 62', will hold the output of buffer 46' at "0" until $V_{cc}$ reaches a threshold voltage, typically 4.5 volts. This also keeps the buffer 45' turned off, since R5' will pull the tristate control lead 47' to ground. In addition, the technology of buffer 45' is such that it guarantees tristate until $V_{cc}$ is above approx. 2 volts regardless of the state of its tristate control lead 47'. Therefore, during the power up sequence, until the threshold voltage is reached, buffer 45' will not affect conductor 39 since buffer 45' will be tristate up to approx. 2 volts, and will remain tristate above that voltage as a result of the control by buffer 46', flip flop 44', low voltage detector 62', and resistor R5'. When the voltage threshold is reached, buffer 46' will be enabled by the low voltage detector, 62', but buffer 45' will remain off since the initial output from flip flop 44' will be "0". The microprocessor, 42', will then read the signal from conductor 39 and will couple that signal to flip flop 43' while also putting a "1" into flip flop 44'. As a result, a "1" will appear at the output of buffer 46' to turn on the buffer 45' and permit the signal from flip flop 43' to be transmitted to conductor 39.

The resistor R4' has a high impedance (e.g., 10 kohms–50 kohms) which prevents loading down conductor 39 during power up. R1' and R2' prevent loading down conductor 38 during power up. Preferably, resistor R1 is at least 10 kohms and R2 is in the range 1–1.5 kohms.

Now assume TSI 31 has lost power from its module, $V_{cc}$. When power drops below the 4.5 volt threshold, low voltage detector 62' tristates buffer 46' which in turn draws buffer 45' tristate control lead 47' to ground through resistor R5'. The value on conductor 39 is now maintained by buffer 41 and R2 in TSI 30. When the voltage drops below 2 volts, 45' will be tristate regardless of any signal on the tristate control lead 47'. The high impedance of resistors R1' and R2' prevent loading down conductor 38, and R4' prevents loading down conductor 39 while power is off. That is, microprocessor 42' could draw the signal on conductor 39 to ground if R4' were not present. Similarly, hit timer 40' could draw 38 to ground if R1' were absent.

When power is returned, the sequence is the same as previously described for insertion of the circuit pack.

I claim:

1. A circuit comprising:

means for receiving a first logic signal from a first conductor which is connectable to an alternate, essentially identical circuit;

means for returning the same first logic signal to the first conductor so that the signal remains on the first conductor when the alternate circuit is disconnected from the first conductor;

means for detecting a second signal from a second conductor which is also connectable to the alternate circuit; and means for applying the same second signal to the second conductor when the alternate circuit is reconnected to the second conductor after having been disconnected from the second conductor.

2. The circuit according to claim 1 wherein the circuit is part of a Time Slot Interchanger.

3. The circuit according to claim 1 wherein the means for receiving the first signal comprises a first resistor.

4. The circuit according to claim 3 further comprising a hit timer circuit connected to the resistor.

5. The circuit according to claim 1 wherein the means for returning the signal comprises a first buffer connectable to the first conductor.

6. The circuit according to claim 5 wherein the buffer is connected to a second, high impedance resistor which is connectable to the first conductor.

7. The circuit according to claim 3 further comprising a high impedance second resistor coupled in series with the first resistor, the second resistor being a portion of the means for returning the signal.

8. The circuit according to claim 1 wherein the means for detecting the second signal comprises a third, high impedance resistor connectable to the second conductor, and a microprocessor connected to the resistor.

9. The circuit according to claim 8 wherein the means for applying the second signal to the second conductor comprises a second buffer coupled to the microprocessor.

10. The circuit according to claim 9 wherein the second buffer is coupled to the microprocessor through a first flip flop element.

11. The circuit according to claim 10 wherin the second buffer is kept tristated during power up of the circuit by a third buffer coupled to the second buffer and also coupled to the microprocessor through a second flip flop element.

12. The circuit according to claim 11 further comprising a low voltage detector coupled to the third buffer and to the second flip flop element.

13. The circuit according to claim 1 wherein the circuit further comprises a board mounted power module and means for preventing loading down the first and second conductors while the power supplied by the module is below a threshold level.

14. The circuit according to claim 13 wherein the means for preventing comprises high impedance resistors coupled to the first and second conductors.

* * * * *